UNITED STATES PATENT OFFICE.

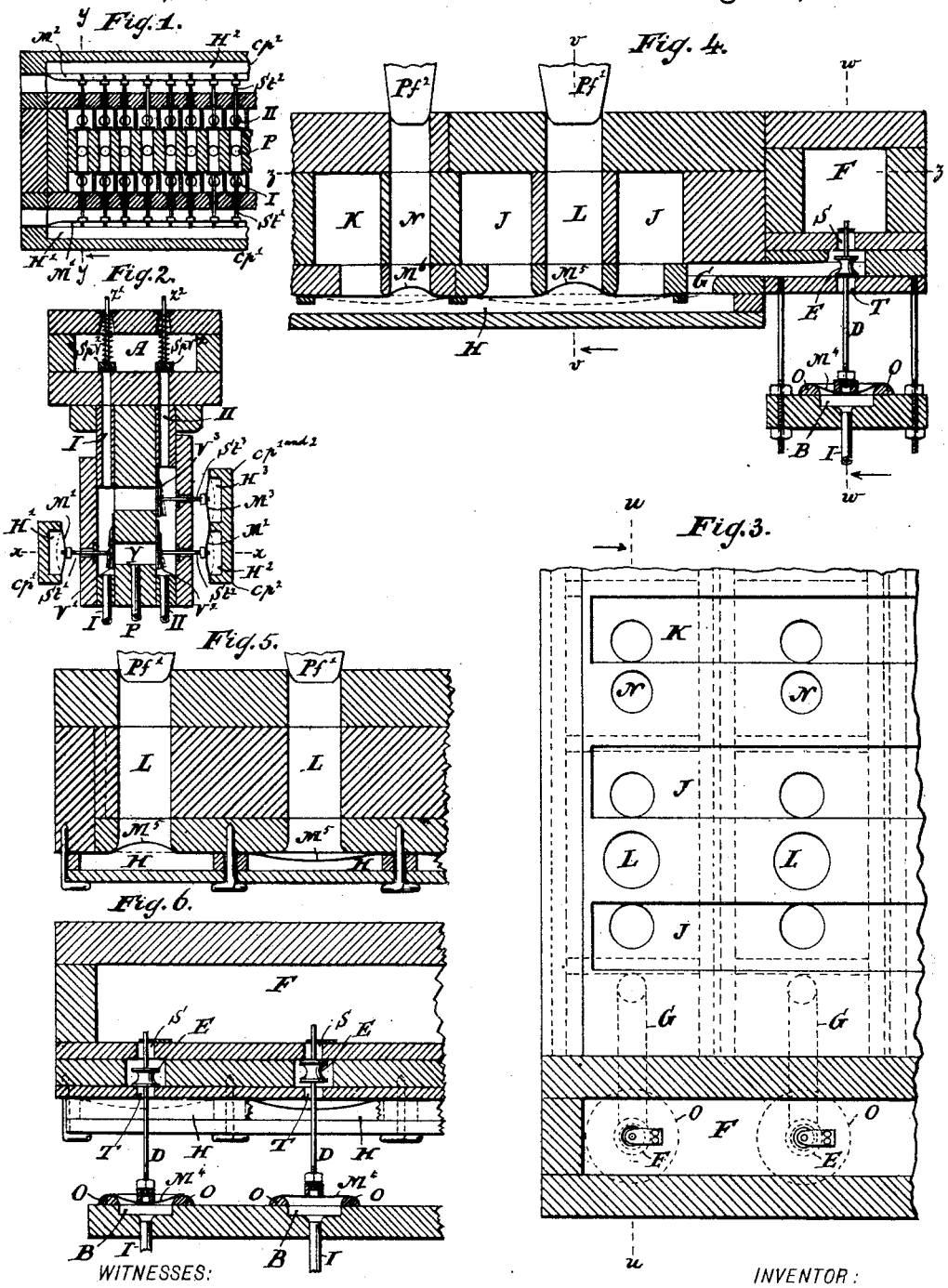

CARL GOTTLIEB WEIGLE, OF STUTTGART, GERMANY.

WIND-CHEST FOR ORGANS.

SPECIFICATION forming part of Letters Patent No. 457,686, dated August 11, 1891.

Application filed February 12, 1891. Serial No. 381,216. (No model.) Patented in Switzerland July 10, 1890, No. 2,445; in France July 15, 1890, No. 206,983, and in Belgium November 19, 1890, No. 92,785.

*To all whom it may concern:*

Be it known that I, CARL GOTTLIEB WEIGLE, a subject of the King of Würtemburg, residing at Stuttgart, Kingdom of Würtemburg, German Empire, have invented certain new and useful Improvements in Wind-Chests for Organs, (for which I have obtained patents in Belgium, dated November 19, 1890, No. 92,785; in France, dated July 15, 1890, No. 206,983, and in Switzerland, dated July 10, 1890, No. 2,445,) of which the following is a specification.

This invention has for its object the removal of several complicated mechanisms of the former mechanical and pneumatic tube construction of organs It relates principally to the construction of the wind-chest and the coupling arrangement at the manual or key-board. The wind-chest is made of the simplest construction for pneumatic wind-chests so far known, since no vents, rods, stickers, bellows, eccentric rollers, or the like occur therein; but for the wind-closure of the pipe-openings and register-channels there are only employed membranes of rubber cloth treated with oil or leather membranes which are made wind-tight. Mechanisms which are affected by the weather are thus entirely abolished by my new wind-chest. The couplings are characterized by vertically-hanging vents, which are pressed firmly to their seats by means of stickers and membranes actuated from one side only by the wind of the organ. In the annexed drawings these arrangements are illustrated.

Figure 1 shows the coupling arrangement sectioned along $xx$, Fig. 2. Fig. 2 is a section along $yy$, Fig. 1. Fig. 3 is a plan view of the wind-chest sectioned along $zz$, Fig. 4. Fig. 4 is a section along $uu$, Fig. 3. Fig. 5 is a section along $vv$, Fig. 4. Fig. 6 is a section along $ww$, Fig. 4.

By depressing a key of the first manual the pull-wire Z', Fig. 2, is actuated, and thereby the vent $Sp$ V' is opened. The wind from the bellows, guided into the channel A, passes through the opening and the tube I to the space B (shown in Fig. 4) and presses up the rubber or leather membrane $M^4$, glued over the ring O, which membrane, by means of wire D, raises the double vent E, and thereby closes the opening S, so that the wind in channel F can no longer pass through G into H. As long as the vent E rests on the opening T, the wind flows from F through S and G into the channel H. As soon as the proper registers are drawn the organ wind enters the double channel J, Fig. 4, belonging to one register, and the single channel K, belonging to another register. The double channel is intended for a register with large pipes—such as base, principal, or the like—and the single register-channel is for voices with slight consumption of wind. The spaces J and K, as also the openings L and N, are separated from the channel H by means of the square membranes $M^5$ and $M^6$, glued fast at their edges, but left free at their centers, Figs. 4, 5, and 6.

As long as the vent E rests on the opening T the wind passing from F through S and G to H presses the membranes $M^5$ and $M^6$ against the openings L and N, so that wind in the register-channels J and K is entirely shut off from the openings L and N; but when the double vent E closes the opening S the wind in channel H can escape through G and T. The wind in J and K now presses the membranes $M^5$ and $M^6$ away from the openings L and N, flows into the latter, and causes the pipes $Pf'$ and $Pf^2$ to speak or sound. As soon as the vent E sinks again and closes T, the wind entering through S and G to H presses the membranes once more against the openings L and N.

The object of the couplings in Figs. 1 and 2 is that when a pedal key is pressed there is a contemporaneous sounding of the homonymous tones in the first or second manual, or when a key in the first manual is depressed there is a contemporaneous sounding of the analogous tone of the second or third manual.

The arrangement in the pedal is in substance exactly the same as in the manual. Under the pedal key-board there is a channel, as in Fig. 2, with vents. By depressing a pedal key the corresponding vent is opened, as in Fig. 2, and the wind passes through a tube to a pedal-chest constructed as in Fig. 4, and at the same time through a second tube P, Fig. 2, into the space Y, which at the left is closed by vent V′ and at the right by vent V². Cp′ is the coupling from the first manual to the pedal, and Cp² the coupling from the second manual to the pedal. When the coupling-stops are not drawn, the wind in the spaces H′ H² H³, by means of the membrane M′ M² M³, presses the stickers St′, St², and St³ so firmly against the vents V′ V² V³ that the wind entering from the pedal into Y cannot press the vents away. If the coupling from the first or second manual to the pedal is drawn, the wind can escape from channel H′ or H² and the wind in Y presses vent V′ or V² away and flows through tube I or I I to the wind-chest of the first or second manual. There is the same construction for the coupling Cp′ and Cp² from the first to the second manual. The vents V′, V², and V³ prevent the wind escaping from tube I, no matter if a coupling is drawn or not. The pull-wire Z² is actuated and the vent Sp V² opened by a key of the second manual. The wind passes through opening and tube I to the wind-chest of the second manual, constructed the same as shown in Fig. 4. In the case of a third and fourth manual the construction is in substance the same.

What I claim as new, and desire to secure by Letters Patent, is—

The combination, in an organ, of the wind-channel F, having the upper and lower wind-openings S and T, the double vent-valve E, controlling both wind-openings, the rod D, secured to the double vent-valve, the chamber B, the membrane M⁴, arranged over said chamber and connected with the rod, the tube I, the register-channels J K, the pipe-tubes L N, the membranes M⁵ and M⁶, controlling the lower ends of the pipe-tubes, and the channel G, leading from a point between the upper and lower wind-openings S and T to the under side of the membranes controlling the pipe-tubes, substantially as described.

In witness whereof I have hereunto set my hand in presence of two witnesses.

CARL GOTTLIEB WEIGLE.

Witnesses:
WM. HAHN,
H. DIETZ.